United States Patent [19]
Croskey

[11] Patent Number: 5,352,079
[45] Date of Patent: Oct. 4, 1994

[54] RETAINING RING AND CUTTER THEREFOR

[75] Inventor: Ronald A. Croskey, Wilnot, Ohio

[73] Assignee: Eaton Corporation, Cleveland, Ohio

[21] Appl. No.: 34,923

[22] Filed: Mar. 19, 1993

[51] Int. Cl.[5] ............................................. F16B 21/18
[52] U.S. Cl. .................................... 411/518; 411/353
[58] Field of Search ............... 411/352, 353, 517, 518, 411/521

[56] References Cited

U.S. PATENT DOCUMENTS

| | | |
|---|---|---|
| 2,382,947 | 8/1945 | Brozek . |
| 2,491,306 | 12/1949 | Beitl . |
| 2,509,081 | 5/1950 | Bluth et al. . |
| 3,413,809 | 4/1968 | Frailly . |
| 3,460,427 | 8/1969 | Baungarten . |
| 3,469,494 | 9/1969 | Frailly . |
| 4,343,581 | 8/1982 | Millheiser .......................... 411/517 |
| 4,692,079 | 9/1987 | Killian et al. ................... 411/517 X |

FOREIGN PATENT DOCUMENTS 532373 10/1956 Canada ................................ 411/518

Primary Examiner—Neill R. Wilson
Attorney, Agent, or Firm—Albert E. Chrow

[57] ABSTRACT

A split resilient retainng ring (100) is provided that features corresponding slots (14,16) that extend circumferentially away from each other in substantial parallel relationship to the inner periphery (4) and outer periphery (6) of the ring's body portion (2) and that end in apertures (18 and 20) respectively that have a breadth greater than the width of slots (14,16). The slots (14,16) and apertures (18,20) enable fingers (22,22') of a manipulating tool (24) to be inserted thereinto and move circumferentially away from each other along slots (14) and (16) and into apertures (18) and (20) for radially expanding and contracting ring (100) for seating in a groove. A cutting tool (800) is also provided for cutting the profiled trapezoidal configuration providing slot (14) and aperture (18) facing slot (16) and aperture (20) across the split between opposed ends (10) and (12) of ring (100).

8 Claims, 3 Drawing Sheets

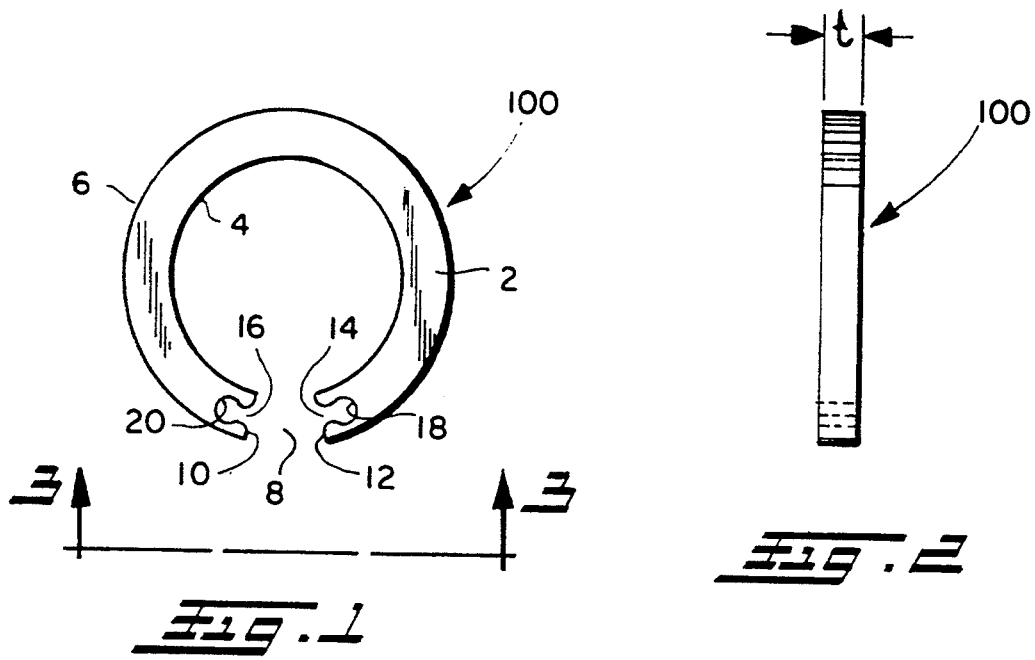
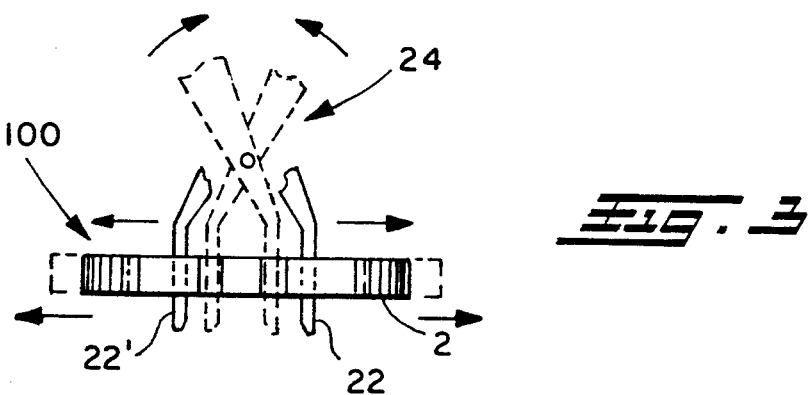
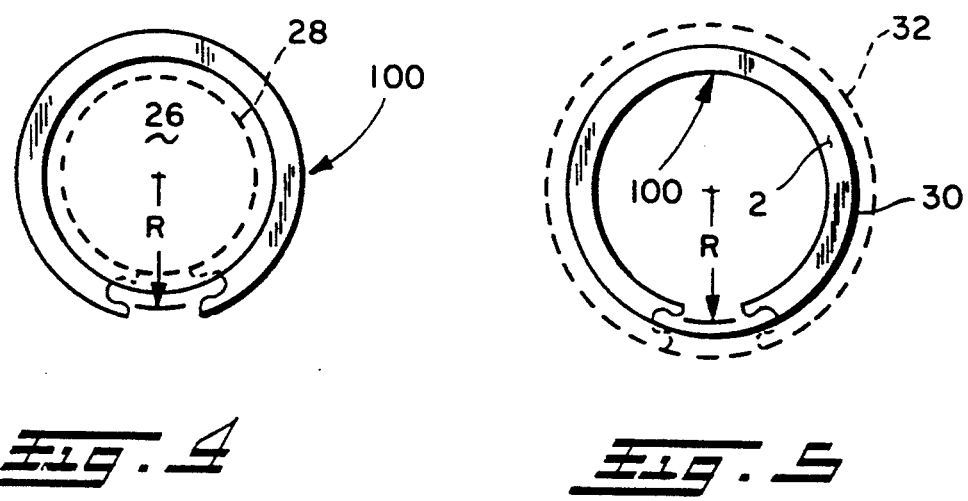

RETAINING RING AND CUTTER THEREFOR

INTRODUCTION

This invention relates generally to a split resilient retaining ring operative to either contractively seat in a groove surrounded by the inner periphery of the ring in registration therewith or to expandingly seat in a surrounding groove in registration with the outer periphery thereof and more particularly to such ring having corresponding radially aligned slots extending away from each other from opposed spaced-apart ends on opposite sides of the split in substantial parallel relationship to the inner and outer peripheries that respectively communicate with apertures through the ring that are operative to receive respective fingers of a manipulation tool thereinto from the slot in communication therewith for expanding and contracting the ring.

BACKGROUND OF THE INVENTION

Split resilient rings have been used for many years for restricting movement of one member relative another member most commonly when the one member is a cylindrical member such as a piston disposed within a bore of the other member.

In such case, either an annular outwardly facing groove is disposed in the outer surface of an inner cylindrical member or an inwardly facing annular groove is disposed on the inner surface of a bore surrounding the inner member and for the former of which the ring is contractively seated upon being released from a radially expanded state and for the latter of which the ring is expandingly seated upon being released from a radially contracted state.

Such split rings are commonly made by cutting a resilient material such as by stamping a suitable sheet metal and of which exemplary examples are disclosed in U.S. Pat. Nos. 2,382,947; 2,491,306; 2,509,081; 3,431,809; and 3,460,427 of which are incorporated herein by reference.

The split retaining ring in U.S. Pat. Nos. 2,382,947; 2,491,306 and 2,529,081 described above all have an opening or hole adjacent their free-ends on opposite sides of the split for receiving fingers of a manipulating tool therethrough for expanding and contracting the ring radially but which require that the fingers enter the openings from a side of the ring and be removed in the same manner. U.S. Pat. No. 3,460,427 discloses in FIGS. 1 and 3 a retaining ring having an elongate slot adjacent ends on opposite sides of the split that are respectively oriented at an acute angle relative the inner and outer peripheries of the ring for receiving fingers thereonto for either expanding or contracting the ring but which again must be inserted into and removed from the slot from a side of the ring.

FIG. 5 of U.S. Pat. No. 3,460,427 discloses the further practice of having openings that extend substantially transversely into each slot from the outer periphery of the ring which would only be accessible to the fingers in applications where the ring is to be seated in an annular groove surrounded by and in registration with an inner periphery of the ring.

The reverse is disclosed in U.S. Pat. No. 3,469,494 in which the retaining ring is provided with respective slots adjacent opposed ends in opposite sides of the split that respectively extend outwardly from the inner periphery in a direction angularly towards each other and thus can be utilized for engagement by fingers of a manipulating tool only for application where the ring is to be seated or is seated in a groove surrounded by the outer periphery of the ring in registration therewith.

Although the aforesaid patents collectively further disclose the practice of diminishing the thickness of the ring from a midpoint to each of the opposed ends to maintain circularity during expanding or contracting the ring as well as to offset the inner and outer peripheries so as to narrow the width of the midpoint and thereby reduce bending stress thereat during expanding or contracting the ring or vice versa to provide the broadest width at the midpoint between the opposite ends or provide a cross section whose thickness diminishes in a direction from the inner periphery to the outer periphery or vice versa or to provide the ring with a helical configuration such as a lock washer, none have disclosed or suggested providing slots respectively extending circumferentially into apertures through the ring from the opposed ends thereof facing towards each other across the split enabling fingers of a manipulating tool to be respectively moved circumferentially away from each other along the slots and enter the apertures for expanding or contracting the ring for use in either external or internal slots in registration therewith nor have they disclosed or suggested a tool by which to cut the ring to provide the profiled configuration herein described in connection therewith.

SUMMARY OF THE INVENTION

Accordingly, it is an object of this invention to provide a split retaining ring operative to contractively seat in a groove surrounded by an inner periphery of the ring in registration therewith and to expandingly seat in a groove surrounding an outer periphery of the ring in registration therewith.

It is another object of this invention to provide a split retaining ring that is provided with respective apertures therethrough adjacent opposed ends thereof facing each other across the split and to which respective radially aligned slots extend from the ends in substantial parallel relationship to the inner and outer peripheries of the ring enabling a pair of fingers of a manipulating tool to move circumferentially in opposite directions therealong and into the apertures for radially expanding and contracting the ring.

It is another object of this invention to provide a tool for cutting a section from a circular ring to provide the split retaining ring having the profiled configuration of the split retaining ring of the invention.

BRIEF DESCRIPTION OF THE DRAWINGS

FIG. 1 is a top elevation view of an embodiment of the retaining ring of the invention referenced by numeral 1;

FIG. 2 is a right side elevation view of retaining ring 100 of FIG. 1;

FIG. 3 is a front side elevation view of retaining ring 100 of FIGS. 1 and 2 that is taken along view line 3—3 in FIG. 1 and is being radially expanded by a manipulating tool 24;

FIG. 4 is a top elevation view of retaining ring (100) respectively seated in an external annular groove;

FIG. 5 is a top elevation view of retaining ring 100 seated in an internal annular groove;

DESCRIPTION OF SOME PREFERRED EMBODIMENTS

Figure 6:
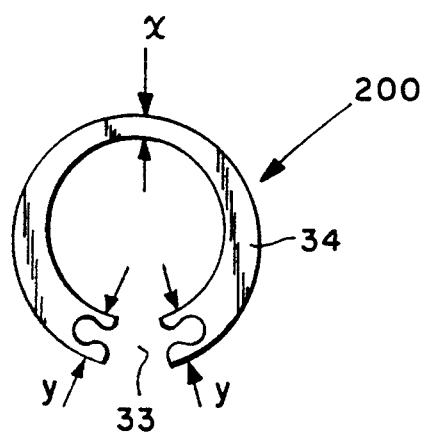
FIGS. 6 and 7 are embodiments of the retaining ring of the invention referenced by numerals 200 and 300 respectively.

Retaining ring 100 of FIGS. 1 and 2 is a split retaining ring having a generally cylindrical configuration comprising a body member 2 having generally circular inner and outer peripheries referenced by numerals 2 and 6 respectively and having a generally flat configuration having on axial thickness referenced by the letter "t" in FIG. 2.

Retaining rings are commonly made by cutting or stamping from a sheet of resilient material such as a suitably resilient sheet metal and of which a preferred embodiment of a cutting tool 800 for making retaining rings in accordance with the invention is hereinafter described with respect to FIGS. 12 and 13.

Retainer ring 100 has a gap at the split therethrough referenced by numeral 8 that is defined between opposed spaced-apart ends 10 and 12 that face each other across gap 8.

A pair of corresponding radially aligned slots 14 and 16 respectively extend circumferentially away from each other from ends 12 and 10 respectively. Slots 14 and 16 are substantially parallel aligned with inner periphery 4 and outer periphery 6 of body member 2.

Slots 14 and 16 communicate with apertures 18 and 20 respectively which extend axially through body member 2 (as do slots 14 and 16) and, although not required, are preferably respective circular apertures.

As illustrated in FIG. 2, a pair of fingers 22 and 22' of a manipulating tool 24 are operative to be inserted into gap 8 and thence move away from each other circumferentially into the entrances of the slots communicating with the respective apertures adjacent the opposed ends of the ring (illustrated in dashed form) and thence move circumferentially therealong and into the respective apertures as illustrated by the solid lines for fingers 22 and 22' upon which the ring is radially expanded as shown by the arrows in FIG. 3.

FIGS. 4 and 5 illustrate the marked advantage associated with retaining rings made in accordance with the invention.

In FIG. 4, retaining ring 100 of FIGS. 1-3 has been radially expanded and then contractively seated in an annular groove 28 circumscribing a cylindrical member referenced by numeral 28. It is to be noted that the opposed slots (not referenced) are in general parallel alignment with the groove and on disposed radially outwardly a distance "R" predetermined to insure that a sufficient amount of either or both the slots and the respective apertures in communication therewith remain sufficiently exposed after the ring has been seated to enable the fingers to enter the slots and move therealong in opposite circumferential directions to radially expand the ring sufficiently for removal from member 26.

FIG. 5 illustrates the reverse of FIG. 4 where ring 100 has been expandingly seated in a groove 32 of member 30 surrounding the outer periphery of ring 100. In this case, the ring has been contracted radially and then permitted to expand into groove 32. Again, ring 100 in FIG. 5 features opposed slots at the ends of body member 2 that are disposed radially a distance "R" predetermined to insure that a sufficient amount of either or both the slots and apertures remain exposed after the ring is seated to insure that fingers of a manipulating tool are able to enter thereto to radially contract ring 100 sufficiently to remove it from member 30.

FIG. 6 illustrates an embodiment of the retaining ring of the invention referenced by numeral 200 where the thickness of body portion 34 is not uniform about the circumference but rather has a minimum width "x" at the midpoint spaced circumferentially equi-distant from the opposed ends facing each other across gap 33 and has its maximum width "y" at or adjacent the opposed ends. Such is of advantage in enabling the ring to retain circularity during the expansion and contraction thereof.

Figure 7:
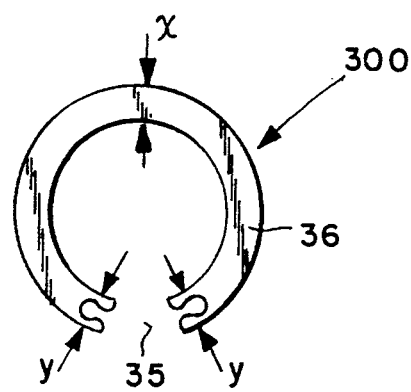

In FIG. 7, body portion 36 of ring 300 has its maximum width "x" at the circumferential midpoint between its opposite ends facing towards each other across gap 35 and its minimum width "y" at or adjacent the opposed ends. Such is of advantage in reducing stress during radial expansion and contraction of ring 30 by increasing the cross-sectional area at the midport.

Figure 8:
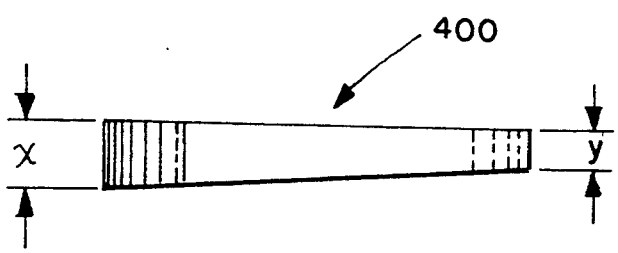
FIG. 8 a side elevation view of another embodiment of the retaining ring of the invention referenced by numeral 400.

FIG. 8 illustrates an embodiment of the retaining ring of the invention referenced by numeral 400 that is not flat in the axial direction but rather its thickness diminishes from a maximum of "x" at the midport to a minimum of "y" at the opposed ends. Such an advantage in maintaining circularity during radial expansion and contracting as well as diminishing stress at the midpoint as previously described.

Figure 9:
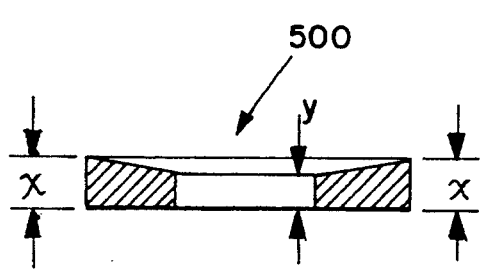
FIGS. 9-10 are central cross-sectional views of further embodiments of the retaining ring of the invention referenced by numerals 500 and 600 respectively.
Figure 10:
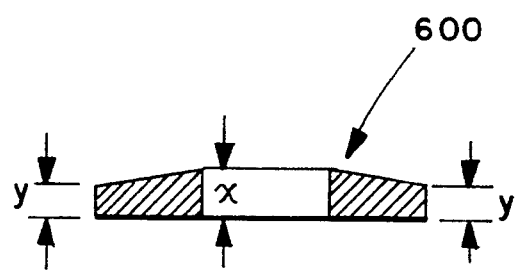

FIGS. 9 and 10 illustrate that the cross-sectional configuration of retaining rings of the invention is not limited to being retangular but may have any cross-sectional configuration that does not inhibit the radial expansion and contraction seating characteristics required. The cross-sectional configuration shown in FIGS. 9 and 10 are not generally retangular but rather the axial thickness "y" at the inner periphery of the retainer ring 500 of FIG. 9 is less than the axial thickness "x" at the outer periphery and the reverse is true for retainer ring 600 of FIG. 10.

Figure 11:
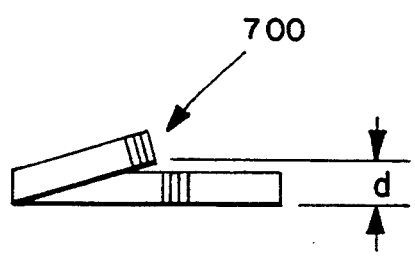
FIG. 11 is a side elevation view of another retaining ring of the invention referenced by numeral 700.

FIG. 11 illustrates an embodiment of the retainer ring of the invention referenced by numeral 700 where the opposed ends of the ring facing each other across the gap therebetween are axially offset from each other by the distance "d" such that ring 700 advances helically in the axial direction as in the case with split lock washers. In such instances the groove width may have to be increased to accommodate the offset.

Figure 12:
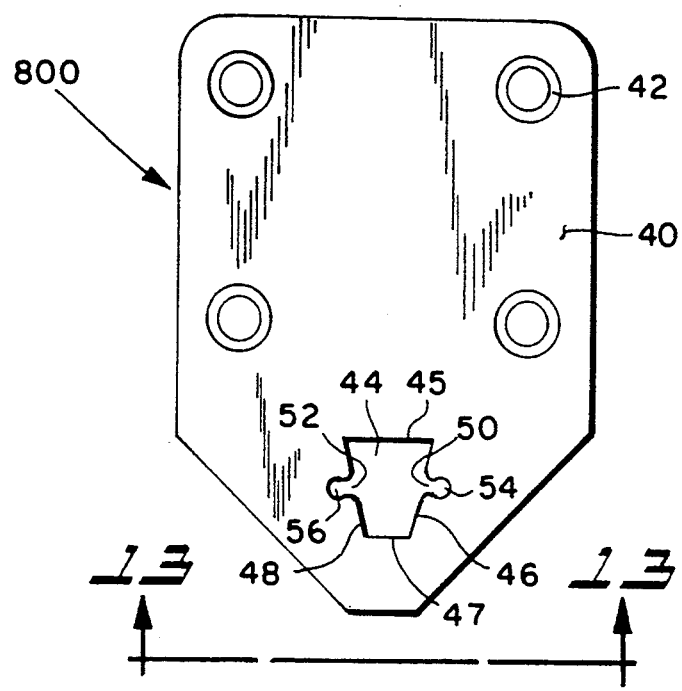
FIGS. 12 and 13 are respective top elevation and side elevation views of a preferred embodiment of a cutting tool for making the retaining ring of the invention referenced by numeral 800.
Figure 13:
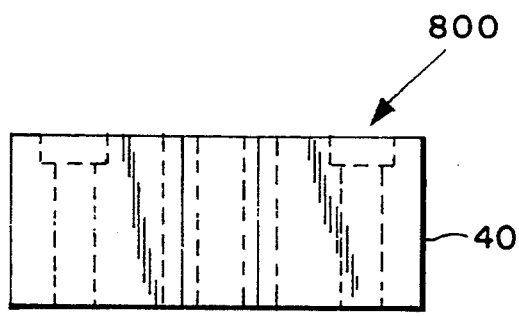

FIGS. 12 and 13 illustrate an embodiment of a cutting tool 800 adapted to cut the profiled section from a circular ring to provide the retaining ring of the invention.

Cutting tool 800 is made from a hardened tool steel that has undergone heat treating well known to those skilled in art of making cutting tools particularly when the tool must be able to respectively cut or stamp retaining rings from resilient sheet metal.

Tool 800 has a body member 40 having four spaced-apart bolt holes (one referenced by numeral 42) therethrough for bolting it to a platen or the like of a hydraulic ram or other device providing sufficient force to cause tool 800 to cut through the thickness of the material from which the retaining ring is to be made.

Tool 800 has a generally retangular side view configuration and has a trapezoidal opening therethrough defined between spaced-apart sides 46 and 48 that respectively extend between a base 45 that is wider than top 47 spaced-apart from bottom 45 at the opposite ends of ends of sides 46 and 48. A pair of aligned slots 50,52 extend transversely away from sides 46 and 48 respectively in a direction away from each other for the length of tool 800 and respectively communicate with apertures 54 and 52 that extend through tool 800 in substantial parallel relationship to each other.

As shown in FIG. 12, the profiled trapezoidal opening through tool 800 is operative to provide the profiled configuration associated with the retaining ring of the invention as it cuts the section from the circular or cylindrical ring from which it is made.

What is claimed is:

1. A substantially cylindrical split resilient retaining ring adapted to expandedly seat in an external groove surrounding an outer periphery of the ring in registration therewith when released from a radially comprised state and to contractively seat in an internal groove surrounded by an inner periphery of the ring in registration therewith upon release from a radially expanded state, said ring having a pair of opposed spaced-apart facing ends on opposite sides of the split having corresponding substantially radially aligned slots therethrough having a prescribed radial width and extending away from each other in substantial parallel relationship to the inner and outer peripheries for a prescribed circumferential distance and communicating with respective apertures therethrough having a breadth that is larger than the width of the slots such that a pair of fingers of a manipulating tool are respectively operative to move away from each other circumferentially along the slots and into the respective apertures for radially expanding and contracting the ring.

2. The retaining ring of claim 1 wherein the apertures are respectively substantially circular apertures.

3. The retaining ring of claim 1 wherein the thickness of the ring tapers circumferentially from a maximum at midpoint located substantially circumferentially equi-distant from the opposed facing ends to a minimum section respectively thereat.

4. The retaining ring of claim 1 wherein the radial width between the inner and outer peripheries increases from a minimum at a midpoint located substantially circumferentially equi-distant from the facing edges to a maximum respectively thereat.

5. The retaining ring of claim 1 wherein the radial width between the inner and outer peripheries decreases from a maximum at a midpoint located substantially circumferentially equi-distant from the facing edges to a minimum respectively thereat.

6. The retaining ring of claim 1 wherein the thickness of the ring diminishes in a direction radially outwardly from the inner periphery to outer periphery.

7. The retaining ring of claim 1 wherein the thickness of the ring diminishes in a direction radially inwardly from the outer periphery to the inner periphery.

8. The retaining ring of claim 1 wherein the ends are offset from each other at a predetermined axial distance.

* * * * *